United States Patent [19]

Gagliardi, Jr.

[11] Patent Number: 5,284,669

[45] Date of Patent: * Feb. 8, 1994

[54] METHOD OF DRESSING A THIGH CUT OF POULTRY

[75] Inventor: Eugene D. Gagliardi, Jr., Wilmington, Del.

[73] Assignee: Designer Foods, Inc., Chadds Ford, Pa.

[ * ] Notice: The portion of the term of this patent subsequent to Oct. 5, 2010 has been disclaimed.

[21] Appl. No.: 84,391

[22] Filed: Jun. 29, 1993

Related U.S. Application Data

[62] Division of Ser. No. 685,324, Apr. 15, 1991, Pat. No. 5,250,309.

[51] Int. Cl.$^5$ .............................................. A23L 1/315
[52] U.S. Cl. ................................... 426/480; 426/518; 426/644
[58] Field of Search ................... 426/480, 518, 644

[56] References Cited

U.S. PATENT DOCUMENTS

| | | | |
|---|---|---|---|
| 1,980,904 | 11/1934 | Botz | 426/644 |
| 2,243,951 | 6/1941 | Gehlke | 452/160 |
| 2,255,796 | 9/1941 | Linane | 452/149 |
| 2,922,718 | 1/1960 | Sauerslak | 426/644 X |
| 4,027,044 | 5/1977 | Taylor | 426/104 X |

FOREIGN PATENT DOCUMENTS 2566629  1/1986  France .................. 426/644

Primary Examiner—Arthur L. Corbin
Attorney, Agent, or Firm—Panitch, Schwarze, Jacobs & Nadel

[57] ABSTRACT

A method of dressing a thigh cut of poultry having an upper surface, a lower surface and an elongated thigh bone having an axis. The thigh bone is positioned between the upper and lower surfaces. A first cut is made generally perpendicular to the upper surface along a first cut line extending generally parallel to the axis of the bone to remove a first side portion of the thigh cut. The first cut line is spaced from a first side of a bone by a first predetermined distance. A second cut is made generally perpendicular to the upper surface along a second cut line extending generally parallel to the axis of the bone to remove a second side portion of the thigh cut. The second cut line is spaced from a second side of the bone by a second predetermined distance such that the remaining portion of the thigh cut is generally in the form of a parallelogram in cross section.

5 Claims, 1 Drawing Sheet

METHOD OF DRESSING A THIGH CUT OF POULTRY

This is a division of application Ser. No. 07/685,324, filed Apr. 15, 1991, now U.S. Pat. No. 5,250,309.

FIELD OF THE INVENTION

The present invention relates generally to a method of dressing a cut of poultry and, more particularly, to a dressed thigh cut of poultry and method of dressing the same.

BACKGROUND OF THE INVENTION

Poultry is conventionally eviscerated and dressed and sold either as a whole or as parts. One of the parts is the thigh cut, which is usually marketed with the bone therein. Typically, thighs are sold with the skin in place and without dressing. In the view of the increasing demand for such new, innovative products as boneless breasts, tenders, wings, etc., for both the commercial food market and for home use, methods for easily obtaining different types of cuts have become increasingly more desirable. However, the prior art methods of producing dressed cuts of poultry have not been directed to the thigh cut of poultry.

The present invention comprises a method of dressing a thigh cut of poultry such that the thigh cut is generally in the form of a parallelogram in cross section. This dressing provides the thigh cut with an aesthetic appearance which encourages consumers to consume the product. The dressed thigh cut of the present invention is expected to gain widespread consumer acceptance. The method of the present invention is relatively quick and easy to carry out and results in a dressed thigh cut which is both appetizing an convenient for the consumer to handle.

SUMMARY OF THE INVENTION

Briefly stated, the present invention comprises a method of dressing a thigh cut of poultry having an upper surface, a lower surface and an elongated thigh bone positioned therebetween and having an axis. The method comprises:

Cutting the thigh cut generally perpendicular to the upper surface along a first cut line extending generally parallel to the axis of the bone to remove a first side portion of the thigh cut. The first cut line is spaced from a first side of the bone by a first predetermined distance. Cutting the thigh cut generally perpendicular to the upper surface along a second cut line extending generally parallel to the axis of the bone to remove a second side portion of the thigh cut. The second cut line is spaced from a second side of the bone by a second predetermined distance such that the remaining portion of the thigh cut is generally in the form of a parallelogram in cross section.

BRIEF DESCRIPTION OF THE DRAWING

The foregoing summary, as well as the following detailed description, will be better understood when read in conjunction with the appended drawing. For purposes of illustrating the invention, there is shown in the drawing an embodiment which is presently preferred, it being understood, however, that this invention is not limited to the precise arrangements shown. In the drawing.

DETAILED DESCRIPTION OF PREFERRED EMBODIMENT

Figure 1:
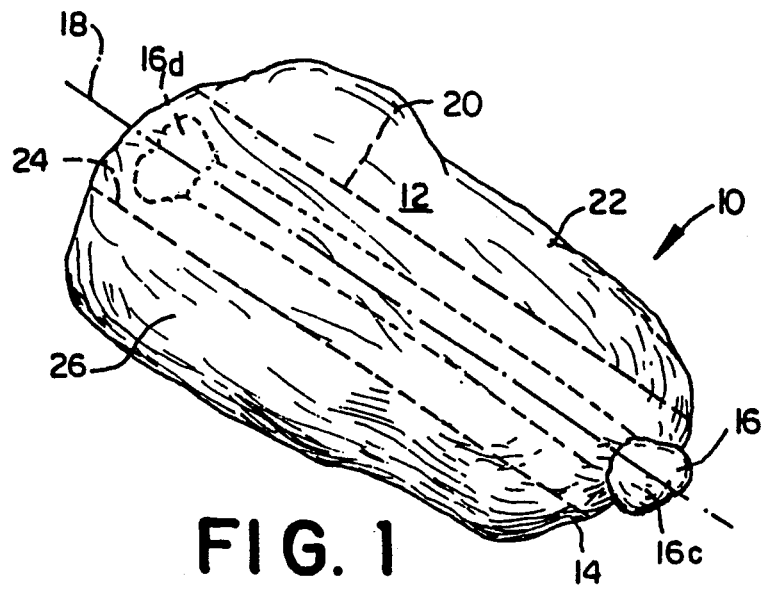
FIG. 1 is a perspective view of an undressed thigh cut with cut lines added to show the method of dressing in accordance with the present invention.
Figure 2:
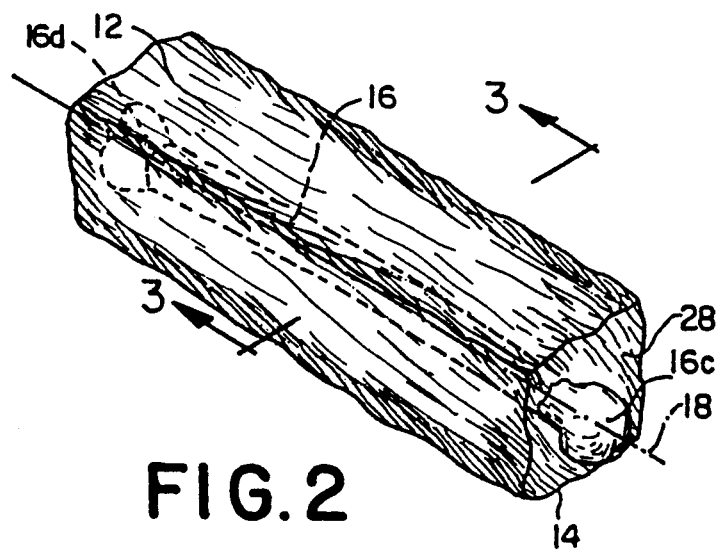
FIG. 2 is a perspective view of a thigh cut which has been dressed in accordance with the method of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the thigh cut and designated parts thereof. The terminology includes the words above specifically mentioned, derivatives thereof and words of similar import.

Referring to the drawings in detail, wherein like numerals indicate like elements throughout, there is shown in FIG. 1 a perspective view of an undressed thigh cut 10 of poultry (not shown) having an upper surface 12, a lower surface 14 and an elongated thigh bone 16 having an axis 18. The thigh bone 16 is positioned generally equidistantly between the upper surface 12 and the lower surface 14, however, its exact position may vary with differing thighs.

It is understood by those skilled in the art that the present invention is not limited to any particular species of poultry. That is, the thigh cut may be taken from poultry such as turkey, chicken, duck, goose, pheasant, and quail without departing from the spirit and scope of the invention. It is also understood by those skilled in the art that the present invention is equally applicable to thigh cuts of other meat products, including rabbit, frog and squirrel.

In the presently preferred embodiment, any skin (not shown) should first be removed from the thigh cut 10. The thigh cut 10 is then cut generally perpendicular to the upper surface 12 along a first cut line 20, the cut extending completely through the meat from the upper surface 12 to the lower surface 14. The first cut line 20 preferably extends generally parallel to the axis 18 of the bone 16 to thereby remove a first side portion 22 from the thigh cut 10. While it is preferred that the skin be removed from the thigh cut 10, it is understood by those skilled in the art that the present invention is equally applicable to a thigh cut having the skin intact (not shown).

The first cut line 20 is preferably spaced from a first side 16a of the bone 16 by a first predetermined distance. It is preferred that the first predetermined distance be approximately equal to one half of the distance between the upper surface 12 and the lower surface 14, for the reasons described hereinafter.

Once the first side meat portion 22 of the thigh cut 10 is removed, the thigh cut 10 is cut generally perpendicular to the upper surface 12 along a second cut line 24 again with the cut extending completely through the meat from the top surface 12 to the bottom surface 14. The second cut line 24 preferably extends generally parallel to the axis 18 of the bone 16 to remove a second side portion 26 of the thigh cut 10. The removed first and second side portions 22, 26 can then be used for other products, such as soup or chicken tenders or "BUFFALO THINGS" or "BUFFALO CHIPS".

Figure 3:
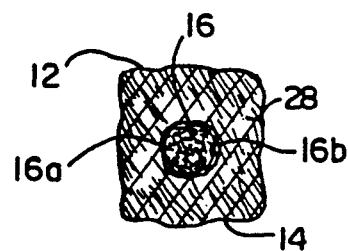
FIG. 3 is a slightly enlarged cross-sectional view of the dressed thigh cut shown in FIG. 2 taken along lines 3—3 of FIG. 2.

As shown in FIG. 1, the second cut line 24 is spaced from a second side 16b of the thigh bone 16 by a second predetermined distance. The second predetermined distance is preferably generally equal to the first predetermined distance. That is, the second predetermined distance is approximately equal to one half of the distance between the upper surface 12 and the lower surface 14 of the thigh cut 10 such that the remaining portion 28 of the thigh cut 10 is generally square in cross section, as best shown in FIG. 3. In this manner the thickness of the meat extending outwardly from the bone 10 is generally equal on all sides.

While it is preferred that the remaining portion 28 of the thigh cut 10 be generally square in cross section, it is understood by those skilled in the art that the remaining portion 28 can be of other cross-sectional configurations so long as the remaining portion 28 is generally uniform in cross-section to thereby provide an aesthetically appetizing appearance. For instance, the first and second cut lines 20, 24 can be spaced from the first and second sides 16a, , 16b of the thigh bone 16 a distance of more than one half of the distance between the upper surface 12 and the lower surface 14 such that the remaining portion would be generally rectangular or generally in the form of a parallelogram in cross section, without departing from the spirit and scope of the invention.

In the case of a typically sized chicken thigh or other similarly sized poultry thigh in which the distance between the first and second thigh surfaces is approximately one inch, it is preferred that the first and second cut lines 20, 24 be spaced from the first and second sides 16a, 16b of the thigh bone 16 approximately one half of an inch so that approximately the same amount of meat is left on all sides of the bone 16, thereby resulting in an aesthetically pleasing and appetizing appearance.

In the event that the remaining meat portion 28 extends completely or partially over the longitudinal ends 16c, 16d of the bone 16, it is preferred that the meat be trimmed away from the longitudinal ends 16c, 16d of the bone 16 to allow the consumer to conveniently grip the longitudinal bone ends 16c, 16d during consumption. In some situations, such trimming is not necessary since the meat shrinks away from the bone ends during cutting. Trimming away the meat which surrounds the longitudinal bone ends 16c, 16d of the bone 16 facilitates handling the dressed thigh cut 10 during consumption. That is, the exposed longitudinal ends 16c, 16d allows the consumer to grip the ends of the dressed thigh cut without having to touch the remaining portion 28 of the thigh cut 10, i.e., the meat and any sauce or coating (not shown) thereon. Consequently, a thigh cut 10 dressed in accordance with the present invention is particularly well suited to be consumed by hand (i.e., as finger food) without the need of utensils, such as a fork and knife. However, it is understood by those skilled in the art that the present invention is not limited to being consumed without utensils, as the same may be utilized when desired.

It is recognized by those skilled in the art that the present invention can be carried out manually, or by suitable automatic poultry cutting apparatus which are well known to those skilled in the art. For ease of dressing the thigh cut 10, it is preferred that the thigh cut be chilled prior to cutting the thigh cut for facilitating the cutting process.

While the above-described cuts are described as being made in an order or sequence which is presently preferred, it should be understood and appreciated that the cuts could be made in any other desired order or sequence to yield the same result. Therefore, the present invention is not limited to the particular order or sequence of cuts.

From the foregoing description, it can be seen that the present invention comprises a new and unique method of dressing a poultry thigh cut. The method is relatively quick and easy to employ and the remaining meat portion is both appetizing and convenient for the consumer to handle. It will be recognized by those skilled in the art that changes could be made to the above-described embodiment of the invention without departing from the broad inventive concepts thereof. For example, the order in which the cuts are made could be altered. It is understood, therefore, that this invention is not limited to the particular embodiment disclosed, but is intended to cover any modifications which are within the spirit and scope of the invention as defined by the appended claims.

I claim:

1. A method of dressing a thigh cut of poultry having an upper surface, a lower surface and an elongated thigh bone positioned therebetween, said thigh bone having an axis and a pair of longitudinal ends, said method comprising the steps of:

cutting generally perpendicular to said upper surface along a first cut line extending generally parallel to the axis of said bone to remove a first side portion of said thigh cut, said first cut line being spaced from a first side of said bone by a first predetermined distance for forming a first thigh portion having a generally planar surface; and cutting generally perpendicular to said upper surface along a second cut line extending generally parallel to the axis of said bone to remove a second side portion of said thigh cut, said second cut line being spaced from a second side of said bone by a second predetermined distance for forming a second thigh portion having a generally planar surface whereby the remaining meat portion of said thigh cut is generally in the form of a parallelogram in cross section such that the width of the thigh cut is substantially the same throughout.

2. The method as recited in claim 1 wherein said first and second predetermined distances are approximately equal to one half of the distance between said upper surface and said lower surface of said thigh cut such that the remaining portion of said thigh cut is generally square in cross section.

3. The method as recited in claim 1, further including the step of removing any skin from said thigh cut.

4. The method as recited in claim 1, further including chilling of said thigh cut prior to cutting said thigh cut.

5. The method as recited in claim 1, further including the step of trimming the remaining meat portion away from the longitudinal ends of the bone to expose the longitudinal bone ends and thereby facilitate consumption of the remaining portion by hand.

* * * * *